J. S. LANSILL.
HEEL GAUGE.
APPLICATION FILED APR. 5, 1921.

1,423,859.

Patented July 25, 1922.

INVENTOR.
John S. Lansill
by Bakewell, Byrnes & Parmelee
his Attys.

UNITED STATES PATENT OFFICE.

JOHN S. LANSILL, OF LANCASTER, PENNSYLVANIA, ASSIGNOR TO ARMSTRONG CORK COMPANY, OF LANCASTER, PENNSYLVANIA, A CORPORATION OF PENNSYLVANIA.

HEEL GAUGE.

1,423,859.    Specification of Letters Patent.    Patented July 25, 1922.

Application filed April 5, 1921. Serial No. 458,808.

*To all whom it may concern:*

Be it known that I, JOHN S. LANSILL, a citizen of the United States, residing at Lancaster, in the county of Lancaster and State of Pennsylvania, have invented a new and useful Improvement in Heel-Gauges, of which the following is a full, clear, and exact description, reference being had to the accompanying drawings, forming part of this specification, in which:—

My invention has relation to heel gauges, and is designed to provide a simple and convenient device for use in repairing boots and shoes, for ascertaining the proper size of heel to be used.

The gauge constituting my invention comprises a relatively thin, flat plate member 2 having two of its edges provided with flanges 3, and also having formed therethrough a series of openings 4. On the side of the plate opposite the flanges 3, the surface of the plate is provided with a series of markings or lines 5 conforming to the outline or perimeter of different sizes of boot or shoe heels. These gauge marks or lines all originate at that corner of the gauge where the flanges 3 intersect. Each gauge line is provided with a number corresponding to the size number of the particular heel which it represents.

Figure 1:
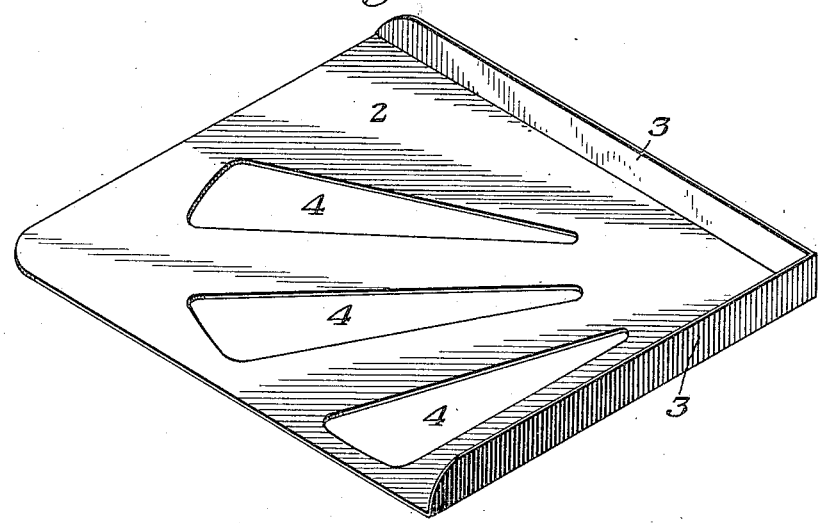
Figure 1 is a perspective view of a gauge embodying my invention.
Figure 2:
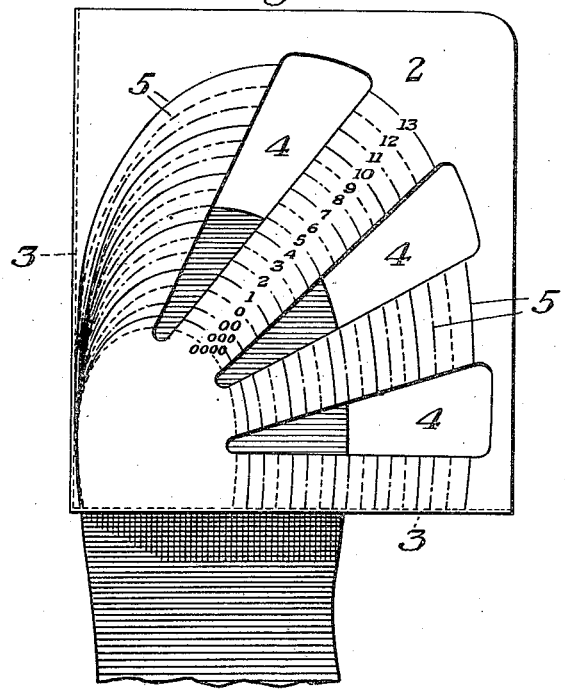
Figure 2 is a plan view of the same.

In using the device, it is placed upon a heel of a boot or shoe, in the position shown in Figure 2. The outlines of the boot or shoe heel can be seen through the openings 4, and the proper size of heel to be applied can be readily determined by noting the gauge line which corresponds to that particular size. The flanges 3 serve to properly position the device on the heel, while the size is being taken.

The invention forms a very simple, convenient, and inexpensive means for the purpose described.

I do not wish to limit myself to the exact construction which I have shown and described, as it is obvious that various changes can be made in the details thereof without departing from the spirit and scope of my invention as defined in the appended claims.

I claim:

1. A gauge having a series of heel contour gauge or size lines or markings thereon, said lines or markings having a substantially common point of origin, substantially as described.

2. A gauge having a series of heel contour gauge or size lines or markings thereon, said lines or markings having a substantially common point of origin at one corner portion of the gauge, substantially as described.

3. A gauge having a series of heel contour gauge or size lines or markings thereon, said lines or markings having a substantially common point of origin, said gauge also having an opening therethrough intersected by said lines or markings, substantially as described.

4. A gauge having a series of heel contour gauge or size lines or markings thereon, said lines or markings having a substantially common point of origin, said gauge also having a plurality of openings therethrough intersected by said lines or markings, substantially as described.

5. A size gauge for the purpose described, comprising a relatively flat plate member having positioning means at two of its edges extending at substantially right angles to each other and having upon one surface thereof a plurality of size or gauge lines or markings representing different sizes of heels and all originating at one corner portion of the gauge, said gauge being constructed to permit comparison of said indications with a heel positioned by said means, substantially as described.

6. A size gauge for the purpose described, comprising a relatively flat plate member having positioning means at its edges and having upon one surface thereof a plurality of size or gauge lines or markings representing different sizes of heels and all originating at one corner portion of the gauge, the gauge having an opening or openings therein intersected by the said lines or markings, substantially as described.

7. A size gauge for the purpose described, comprising a relatively flat plate member having projecting from one side thereof adjacent two of its edges positioning means extending at substantially right angles to each other, and having upon its opposite side a plurality of heel size indications, said gauge being constructed to permit comparison of said indications with a heel positioned by said means, substantially as described.

8. A size gauge for the purpose described, comprising a relatively flat plate member having flanges formed on two of its edges and projecting below one side of the plate, and gauge lines on the opposite side of the plate from said flanges, said gauge being constructed to permit comparison of said indications with a heel positioned by said means, substantially as described.

9. A size gauge for the purpose described, comprising a relatively flat plate member having intersecting flanges formed on two of its adjacent edges and projecting below one side of the plate to cooperate with the heel and position the same, and gauge lines on the body of the plate, said gauge being constructed to permit comparison of said indications with a heel positioned by said means, substantially as described.

10. A size gauge for the purpose described, comprising a relatively flat plate member having intersecting flanges formed on two of its adjacent edges and projecting below one side of the plate to cooperate with the heel and position the same, and gauge lines on the body of the plate all originating at the corner at which said flanges intersect, said gauge being constructed to permit comparison of said indications with a heel positioned by said means, substantially as described.

In testimony whereof, I have hereunto set my hand.

JOHN S. LANSILL